US008749875B2

(12) United States Patent
Benton et al.

(10) Patent No.: US 8,749,875 B2
(45) Date of Patent: Jun. 10, 2014

(54) NON-LINEAR OPTICAL DEVICE

(75) Inventors: David M. Benton, Tewkesbury (GB);
Philip M. Gorman, Malvern (GB); Paul R. Tapster, Malvern (GB); David Maurice Taylor, Gloucester (GB); Ewan D. Finlayson, Malvern (GB)

(73) Assignee: Qinetiq Limited, Hampshire (GB)

( * ) Notice: Subject to any disclaimer, the term of this patent is extended or adjusted under 35 U.S.C. 154(b) by 142 days.

(21) Appl. No.: 13/130,944

(22) PCT Filed: Nov. 25, 2009

(86) PCT No.: PCT/GB2009/002745
§ 371 (c)(1),
(2), (4) Date: May 24, 2011

(87) PCT Pub. No.: WO2010/067045
PCT Pub. Date: Jun. 17, 2010

(65) Prior Publication Data
US 2011/0228380 A1    Sep. 22, 2011

(30) Foreign Application Priority Data

Dec. 8, 2008   (GB) .................................. 0822356.2

(51) Int. Cl.
*G02F 1/365*       (2006.01)
*G02B 6/10*        (2006.01)
(52) U.S. Cl.
USPC ............................. 359/328; 385/45; 385/122
(58) Field of Classification Search
USPC .......... 385/45, 122; 359/326–332; 372/21–22
See application file for complete search history.

(56) References Cited

U.S. PATENT DOCUMENTS

| 3,704,996 | A |   | 12/1972 | Borner et al. |
| 4,291,939 | A |   | 9/1981 | Giallorenzi et al. |
| 4,691,984 | A |   | 9/1987 | Thaniyavarn |
| 4,775,971 | A |   | 10/1988 | Bergmann |
| 4,807,952 | A |   | 2/1989 | Jaeger et al. |
| 4,846,540 | A | * | 7/1989 | Kapon ............................ 385/45 |
| 5,150,436 | A |   | 9/1992 | Jaeger et al. |
| 5,157,754 | A | * | 10/1992 | Bierlein et al. ............... 385/122 |

(Continued)

FOREIGN PATENT DOCUMENTS

| EP | 0 583 115 A1 | 2/1994 |
| EP | 0 610 727 A1 | 8/1994 |

(Continued)

OTHER PUBLICATIONS

Oct. 29, 2012 Office Action issued in U.S. Appl. No. 12/993,146.

(Continued)

*Primary Examiner* — Daniel Petkovsek
(74) *Attorney, Agent, or Firm* — Oliff PLC

(57) ABSTRACT

A non-linear optical device includes a frequency-conversion waveguide and first and second input waveguides. The longitudinal axes of the input waveguides are inclined to that of the frequency-conversion waveguide such a first transverse mode is excited in the latter at the input frequency in operation of the device. The frequency-conversion waveguide supports a second transverse mode at an output frequency of the device, such that the phase velocity of the second transverse mode at the output frequency is substantially equal to that of the first transverse mode at the input frequency, thus providing phase-matching by balancing the effects of chromatic and modal dispersion.

11 Claims, 3 Drawing Sheets

(56) References Cited

U.S. PATENT DOCUMENTS

| | | | |
|---|---|---|---|
| 5,166,991 | A | 11/1992 | Jaeger et al. |
| 5,410,625 | A | 4/1995 | Jenkins et al. |
| 5,414,789 | A * | 5/1995 | Tamil et al. ............. 385/122 |
| 5,428,698 | A | 6/1995 | Jenkins et al. |
| 5,479,514 | A | 12/1995 | Klonowski |
| 5,481,636 | A * | 1/1996 | Fukuda et al. ............ 385/122 |
| 5,566,257 | A | 10/1996 | Jaeger et al. |
| 5,644,664 | A | 7/1997 | Burns et al. |
| 5,757,912 | A | 5/1998 | Blow |
| 5,768,378 | A | 6/1998 | Townsend et al. |
| 5,878,142 | A | 3/1999 | Caputo et al. |
| 5,999,548 | A * | 12/1999 | Mori et al. ................ 372/22 |
| 6,028,935 | A | 2/2000 | Rarity et al. |
| 6,145,079 | A | 11/2000 | Mitty et al. |
| 6,240,514 | B1 | 5/2001 | Inoue et al. |
| 6,717,708 | B2 | 4/2004 | Prosyk |
| 6,798,795 | B2 * | 9/2004 | Yoo ........................... 372/20 |
| 6,806,986 | B2 * | 10/2004 | Asobe et al. .............. 359/238 |
| 7,068,790 | B1 | 6/2006 | Elliott |
| 7,155,078 | B2 | 12/2006 | Welch et al. |
| 7,162,107 | B2 | 1/2007 | Bull et al. |
| 7,181,114 | B2 * | 2/2007 | Lee et al. ................... 385/122 |
| 7,242,775 | B2 | 7/2007 | Vig et al. |
| 7,242,821 | B2 | 7/2007 | Bull et al. |
| 7,248,695 | B1 | 7/2007 | Beal et al. |
| 7,274,791 | B2 | 9/2007 | Van Enk |
| 7,289,688 | B2 | 10/2007 | Bull et al. |
| 7,430,295 | B1 | 9/2008 | Pearson et al. |
| 7,457,416 | B1 | 11/2008 | Elliott |
| 7,460,670 | B1 | 12/2008 | Elliott |
| 7,515,716 | B1 | 4/2009 | Elliott |
| 7,515,801 | B2 * | 4/2009 | McCaughan et al. ...... 385/122 |
| 7,596,318 | B2 | 9/2009 | Han et al. |
| 7,627,126 | B1 | 12/2009 | Pikalo et al. |
| 7,646,873 | B2 | 1/2010 | Lee et al. |
| 7,706,535 | B1 | 4/2010 | Pearson et al. |
| 7,760,883 | B2 | 7/2010 | Kuang |
| 7,864,958 | B2 | 1/2011 | Harrison et al. |
| 7,865,048 | B2 * | 1/2011 | McCaughan et al. ...... 385/122 |
| 8,054,976 | B2 | 11/2011 | Harrison et al. |
| 8,488,790 | B2 | 7/2013 | Wellbrock et al. |
| 2002/0025046 | A1 | 2/2002 | Lin |
| 2002/0087862 | A1 | 7/2002 | Jain et al. |
| 2003/0210912 | A1 | 11/2003 | Leuthold et al. |
| 2003/0214991 | A1 | 11/2003 | Wiedmann et al. |
| 2004/0032954 | A1 | 2/2004 | Bonfrate et al. |
| 2004/0034776 | A1 | 2/2004 | Fernando et al. |
| 2004/0109564 | A1 | 6/2004 | Cerf et al. |
| 2004/0184603 | A1 | 9/2004 | Pearson et al. |
| 2004/0184615 | A1 | 9/2004 | Elliott et al. |
| 2004/0252957 | A1 | 12/2004 | Schmidt et al. |
| 2005/0078826 | A1 | 4/2005 | Takeuchi |
| 2005/0135620 | A1 | 6/2005 | Kastella et al. |
| 2005/0190921 | A1 | 9/2005 | Schlafer et al. |
| 2005/0249352 | A1 | 11/2005 | Choi et al. |
| 2005/0259825 | A1 | 11/2005 | Trifonov |
| 2005/0286723 | A1 | 12/2005 | Vig et al. |
| 2006/0002563 | A1 | 1/2006 | Bussieres et al. |
| 2006/0031828 | A1 | 2/2006 | Won et al. |
| 2006/0059343 | A1 | 3/2006 | Berzanskis et al. |
| 2006/0062392 | A1 | 3/2006 | Lee et al. |
| 2006/0067603 | A1 | 3/2006 | Bull et al. |
| 2006/0083379 | A1 | 4/2006 | Brookner |
| 2006/0290941 | A1 | 12/2006 | Kesler et al. |
| 2007/0014415 | A1 | 1/2007 | Harrison et al. |
| 2007/0016534 | A1 | 1/2007 | Harrison et al. |
| 2007/0065154 | A1 | 3/2007 | Luo et al. |
| 2007/0065155 | A1 | 3/2007 | Luo et al. |
| 2007/0071245 | A1 | 3/2007 | Kuang |
| 2007/0074277 | A1 | 3/2007 | Tofts et al. |
| 2007/0076884 | A1 | 4/2007 | Wellbrock et al. |
| 2007/0101410 | A1 | 5/2007 | Harrison et al. |
| 2007/0104443 | A1 | 5/2007 | Helmy |
| 2007/0122097 | A1 | 5/2007 | Schmidt et al. |
| 2007/0123869 | A1 | 5/2007 | Chin et al. |
| 2007/0130455 | A1 | 6/2007 | Elliott |
| 2007/0133798 | A1 | 6/2007 | Elliott |
| 2007/0160201 | A1 | 7/2007 | Blom et al. |
| 2007/0177735 | A1 | 8/2007 | Mimih et al. |
| 2007/0192598 | A1 | 8/2007 | Troxel et al. |
| 2008/0003104 | A1 | 1/2008 | Betlach |
| 2008/0013738 | A1 | 1/2008 | Tajima et al. |
| 2008/0031456 | A1 | 2/2008 | Harrison et al. |
| 2008/0137858 | A1 | 6/2008 | Gelfond et al. |
| 2008/0144836 | A1 | 6/2008 | Sanders et al. |
| 2008/0147820 | A1 | 6/2008 | Maeda et al. |
| 2008/0175385 | A1 | 7/2008 | Lee et al. |
| 2008/0292095 | A1 | 11/2008 | Vig et al. |
| 2008/0317423 | A1 | 12/2008 | Stepanov et al. |
| 2009/0016736 | A1 | 1/2009 | Beal et al. |
| 2009/0074192 | A1 | 3/2009 | Beal et al. |
| 2009/0106551 | A1 | 4/2009 | Boren et al. |
| 2009/0175452 | A1 | 7/2009 | Gelfond et al. |
| 2009/0316910 | A1 | 12/2009 | Maeda et al. |
| 2010/0098252 | A1 | 4/2010 | Kanter et al. |
| 2010/0226659 | A1 | 9/2010 | Nishioka et al. |
| 2010/0290626 | A1 | 11/2010 | Jenkins et al. |
| 2010/0293380 | A1 | 11/2010 | Wiseman et al. |
| 2010/0299526 | A1 | 11/2010 | Wiseman et al. |
| 2010/0329459 | A1 | 12/2010 | Wiseman et al. |

FOREIGN PATENT DOCUMENTS

| | | |
|---|---|---|
| EP | 1 503 328 A1 | 2/2005 |
| EP | 1 605 287 A2 | 12/2005 |
| EP | 1 633 076 A1 | 3/2006 |
| EP | 1 643 663 A1 | 4/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-268958 | 9/2005 |
| JP | A-2007-500370 | 1/2007 |
| JP | 2007-129562 | 5/2007 |
| WO | WO 92/11550 A1 | 7/1992 |
| WO | WO 92/11551 A1 | 7/1992 |
| WO | WO 92/11554 A2 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |

(56) References Cited

FOREIGN PATENT DOCUMENTS

| WO | WO 2010/049673 A1 | 5/2010 |
|---|---|---|
| WO | WO 2010/064003 A1 | 6/2010 |
| WO | WO 2010/064004 A1 | 6/2010 |

OTHER PUBLICATIONS

Nov. 8, 2012 Office Action issued in U.S. Appl. No. 12/863,510.
Nov. 9, 2012 Office Action issued in U.S. Appl. No. 13/130,790.
Rass, S., "A Method of Authentication for Quantum Networks", PWASET, vol. 12, Mar. 2006; ISSN 1307-6884, pp. 149-154.
Office Action dated May 11, 2012 issued in U.S. Appl. No. 12/812,849.
Stucki et al., "Quantum Key Distribution Over 67km With Plug &Play System," New Journal of Physics 4, pp. 41.1-41.8, 2002.
Bechmann-Pasquinucci et al., "Quantum key distribution with trusted quantum relay", May 12, 2005, p. 1-13, University of Pavia; UCCI.IT.XP 002534289.
Bennett et al., "Quantum Cryptography: Public Key Distribution and Coin Tossing", International Conference on Computers, Systems & Signal Processing, Dec. 10-12, 1984, pp. 1-5, Bangalore, India.
Duligall et al., "Low cost and compact quantum key distribution", New Journal of Physics, Institute of Physics Publishing, Bristol, GB. vol. 8, No. 10, Oct. 2006, pp. 1-16, 2006, XP 020107565.
Elliott et al., "Building the quantum network", New Journal of Physics, Institute of Physics Publishing, Bristol, GB, vol. 4, 12 Jul. 12, 2002, pp. 46.1-46.12, XP 002271991.
Fernandez et al., "Gigahertz Clocked Quantum Key Distribution in Passive Optical Networks", leos Summer Topical Meetings, 2006 Digest of the Quebec City, Canada, Jul. 17, 2006, pp. 36-37, XP 010940123.
Fernandez et al., "Passive Optical Network Approach to Gigahertz-Clocked Multiuser Quantum Key Distribution", Journal of Quantum Electronics, vol. 43, No. 2, pp. 130-138, Feb. 2007.
Brassard et al., "Multi-User Quantum Key Distribution Using Wavelength Division Multiplexing", Université de Montréal, École, Polytechnique de Montréal, pp. 1-5, XP 002534322.
Gordeev et al., "Tunable electro-optic polarization modulator for quantum key distribution applicators", Optics Communications, vol. 234, pp. 203-210, Feb. 18, 2004.
Horikiri et al., "Quantum key distribution with a heralded single photon source", International Quantum Electronics Conference, 2005, pp. 1617-1618, Jul. 11, 2005.
Lee et al., "Quantum Authentication and Quantum Key Distribution Protocol", Korea University, Jan. 11, 2006, pp. 1-8, XP002534292.
Rao et al., "Nonlinear frequency conversion in semiconductor optical waveguides using birefringent, modal and quais-phasematching techniques", Journal of Optics A: Pure and Applied Optics, vol. 6, pp. 569-584, 2004.
Ljunggren et al., "Authority-based user authentication in quantum key distribution", Physical Review A, vol. 62, pp. 022305-1-022305-7, Jul. 13, 2000, XP 002534291.
Kuhn, "A Quantum Cryptographic Protocal with Detection of Compromised Server", Quantum Information and Computation, vol. 5, No. 7, 2005, pp. 551-560, XP 002520284.
Kumavor et al., "Comparison of Four Multi-User Quantum Key Distribution Schemes Over Passive Optical Networks", Journal of Lightwave Technology, vol. 23, No. 1, pp. 268-276, Jan. 2005, XP 001227328.
Malis et al., "Improvement of second-harmonic generation in quantum-cascade lasers with true phase matching", Applied Physics Letters, vol. 84, No. 15, pp. 2721-2723, Apr. 12, 2004, XP 12061044.
Masanovic et al., "Design and Performance of a Monolithically Integrated Widely Tunable All-Optical Wavelength Converter with Independent Phase Control", IEEE Photonics Technology Letters, vol. 16, No. 10, pp. 2299-2301, Oct. 2004.
Menezes et al., "Handbook of Applied Cryptography", Chapter 13 Key Management Techniques, CRC Press LLC, 1997, pp. 547-553, XP 002520285.

Nambu et al., "BB84 Quantum Key Distribution System based on Silica-Based Planar Lightwave Circuits", Apr. 22, 2008, pp. 1-11.
Hwang et al., "Provably Secure Three-Party Authenticated Quantum Key Distribution Protocols", IEEE Transactions on Dependable and Secure Computing, vol. 4, No. 1, pp. 71-80, Jan.-Mar. 2007, XP 11165308.
Mo et al., "Quantum key distribution network with wavelength addressing", University of Science and Technology of China, Oct. 15, 2006, pp. 1-11, XP 002534290.
Nguyen et al., "802.11i Encryption Key Distribution Using Quantum Cryptography", Journal of Networks, vol. 1, No. 5, pp. 9-20, Sep./Oct. 2006, XP 002576733.
Moutzouris et al., "Second Harmonic Generation in GaAs/AlGaAs Waveguides with Femtosecond Pulses Near 1.55 μm Using Modal Phase Matching Technique", Lasers and Electro-Optics Europe, Conference Munich, Germany, Jun. 22-27, 2003, XP 010710252.
Jäger et al., "Modal dispersion phase matching over 7 mm length in overdamped polymeric channel waveguides", Applied Physics Letters, vol. 69, No. 27, pp. 4139-4141, Dec. 30, 1996, XP 12016922.
Yin et al., "Inegrated ARROW waveguides with hollow cores," Optics Express, Optical Society of America, Washington, DC, USA, vol. 12, No. 12, pp. 2710-2715, Jun. 14, 2004, XP 002363659.
Yariv, "Coupled-Mode Theory for Guided-Wave Optics", IEEE Journal of Quantum Electronics, vol. QE9, No. 9, pp. 919-933, Sep. 1973.
Rahmatian et al., "An Ultrahigh-Speed AlGaAs-GaAs Polarization Converter Using Slow Wave Coplanar Electrodes", IEEE Photonics Technology Letters, vol. 10, No. 5, pp. 675-677, May 1998, XP 11046059.
Finlayson et al., "Polarization Conversion in Passive Deep-Etched GaAs/AlGaAs Waveguides", Journal of Lightwave Technology, vol. 24, No. 3, pp. 1425-1432, Mar. 2006, XP 002459136.
Grossard et al., "AlGaAs-GaAs Polarization Converter with Electrooptic Phase Mismatch Control," IEEE Photonics Technology Letters, vol. 13, No. 8, pp. 830-832, Aug. 2001, XP 11047704.
Hall et al., "Optical Guiding and Electro-Optic Modulation in GaAs Epitaxial Layers, "Optics Communications, vol. 1, No. 9, pp. 403-405, Apr. 1970.
Haxha et al., "Analysis of polarization conversion in AlGaAs/GaAs electrooptic polarization converter", Optics Communications, vol. 262, pp. 47-56, 2006, XP 002459135.
Heaton et al., "Optimization of Deep-Etched, Single Mode GaAs/AlGaAs Optical Waveguides Using Controlled Leakage Into The Substrate", Journal of Lightwave Technology, vol. 17, No. 2, pp. 267-281, Feb. 1999.
Izuhara et al., "Low-voltage tunable TE/TM converter on ion-sliced lithium niobate thin film", Electronics Letters, vol. 39, No. 15, Jul. 24, 2003, XP 6020699.
Schlak et al., "Tunable TE/TM-Mode Converter on (001) In-P-Substrate", IEEE Photonic Technology Letters, vol. 3, No. 1, pp. 15-16, Jan. 1991.
Wang et al., "High Speed III-V Electrooptic Waveguide Modulators at λ=1.3 μm", Journal of Lightwave Technology, vol. 6, No. 6, pp. 758-771, Jun. 1988.
Kanamori et al., "Three-party Quantum Authenticated Key Distribution with Partially Trusted Third Party," Global Telecommunications Conference, 2008, IEEE Globecom 2008 Proceedings, Piscataway, NJ, USA, Nov. 30, 2008, pp. 1-5. XP 031370037.
Toliver et al., "Demonstration of 1550 nm QKD with Roadm-based DWDM Networking and the Impact of Fiber FWM", 2007 Conference on Lasers, XP 31231032.
Mar. 31, 2009 International Search Report issued in International Application No. PCT/GB2009/000190.
Mar. 31, 2009 Written Opinion of the International Searching Authority in International Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion of the International Searching Authority issued in Application No. PCT/GB2009/000189.
Aug. 3, 2010 International Preliminary Report on Patentability issued in Application No. PCT/GB2009/000179.

(56) References Cited

OTHER PUBLICATIONS

Jun. 2, 2009 International Search Report issued in Application No. PCT/GB2009/000179.
Jun. 2, 2009 Written Opinion of the International Searching Authority issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion of the International Searching Authority issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion of the International Searching Authority issued in Application No. PCT/GB2009/001223.
Jul. 14, 2009 International Search Report issued in Application No. PCT/GB2009/001226.
Jul. 14, 2009 Written Opinion of the International Searching Authority issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Aug. 13, 2008 British Search Report issued in Application No. GB0809038.3.
Aug. 13, 2008 British Search Report issued in Application No. GB0809044.1.
Aug. 14, 2008 British Search Report issued in Application No. GB0809045.8.
Jan. 23, 2009 British Search Report issued in Application No. GB0819665.1.
Mar. 19, 2010 International Search Report issued in Application No. PCT/GB2009/002543.
Mar. 19, 2010 Written Opinion of the International Searching Authority issued in Application No. PCT/GB2009/002543.
Mar. 18, 2009 British Search Report issued in Application No. GB0822356.2.
Dec. 21, 2009 International Search Report issued in Application No. PCT/GB2009/002745.
Dec. 21, 2009 Written Opinion of the International Searching Authority issued in Application No. PCT/GB2009/002745.
Mar. 16, 2009 British Search Report issued in Application No. GB0822254.9.
Sep. 23, 2010 International Search Report issued in Application No. PCT/GB2009/002802.
Sep. 23, 2010 Written Opinion of the International Searching Authority issued in Application No. PCT/GB2009/002802.
Mar. 16, 2009 British Search Report issued in Application No. GB0822253.1.
Apr. 7, 2010 International Search Report issued in Application No. PCT/GB2009/002801.
Apr. 7, 2010 Written Opinion of the International Searching Authority issued in Application No. PCT/GB2009/002801.
Jan. 25, 2010 British Search Report issued in Application No. GB0917060.6.
Mar. 21, 2011 International Search Report issued in Application No. PCT/GB2010/001811.
Mar. 21, 2011 Written Opinion of the International Searching Authority issued in Application No. PCT/GB2010/001811.
Jun. 29, 2010 British Search Report issued in Application No. GB0917060.6.
Jun. 1, 2011 International Search Report issued in Application No. PCT/GB2010/001811.
Jun. 1, 2011 Written Opinion issued in Application No. PCT/GB2010/001811.
U.S. Appl. No. 12/993,146 in the name of Hicks et al., filed Nov. 17, 2010.
U.S. Appl. No. 12/993,098 in the name of Wiseman et al., filed Nov. 17, 2010.
U.S. Appl. No. 12/992,695 in the name of Wiseman et al., filed Nov. 15, 2010.
U.S. Appl. No. 13/125,735 in the name of Wiseman et al., filed Apr. 22, 2011.
U.S. Appl. No. 13/130,897 in the name of Wiseman et al., filed May 24, 2011.
U.S. Appl. No. 13/130,790 in the name of Wiseman et al., filed May 24, 2011.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates for Practical Quantum Cryptography," Helsinki Institute of Physics, Feb. 1, 2008, pp. 1-26, Helsinki, Finland.
May 31, 2012 Search Report and Written Opinion issued in International Application No. PCT/GB2011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
Sep. 21, 2012 Office Action issued in U.S. Appl. No. 12/812,849.
Oct. 4, 2012 Office Action issued in U.S. Appl. No. 12/992,695.
U.S. Appl. No. 13/496,324 in the name of Ayling, filed on Mar. 15, 2012.
U.S. Appl. No. 12/863,483 in the name of Wiseman, filed on Jul. 19, 2010.
U.S. Appl. No. 12/863,509 in the name of Jenkins, filed on Jul. 19, 2010.
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Ibrahim et al., "Simulation of Static Optical XPM in Active MMI Couplers," (published in International Conference on Numerical Simulation of Optoelectronic Devices, Sep. 2007), pp. 95-96.
Jun. 11, 2013 Office Action issued in U.S. Appl. No. 12/863,509.
Jun. 19, 2013 Notice of Allowance issued in U.S. Appl. No. 12/993,146.
Jun. 28, 2013 Office Action issued in U.S. Appl. No. 13/130,790.
Jul. 3, 2013 Final Rejection issued in U.S. Appl. No. 12/993,098.
Jul. 8, 2013 Office Action issued in U.S. Appl. No. 13/496,324.
Nov. 5, 2013 Office Action issued in U.S. Appl. No. 12/863,510.
Nov. 7, 2013 Office Action issued in U.S. Appl. No. 12/993,098.
Lijun MA, "Experimental Demonstration of an Active Quantum Key Distribution Network with Over Gbps Clock Synchronization," IEEE Communications Letters, vol. 11, No. 12, Dec. 2007, pp. 1019-1021.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.

(56) References Cited

OTHER PUBLICATIONS

Mar. 13, 2013 Office Action issued in U.S. Appl. No. 12/992,695.

May 10, 2013 Office Action issued in U.S. Appl. No. 13/130,897.

Feb. 19, 2014 Notice of Allowance issued in U.S. Appl. No. 12/992,695.

Fung, Chi-hang Fred et al. "Security proof of quantum key distribution with detection efficiency mismatch," Jan. 2009, pp. 131-165, vol. 9, No. 1&2, Rinton Press.

John P. Barber; Integrated hollow and solid-core waveguides for sensor platforms; Year: 2005; OSA/IPRA; p. 1-3.

Office Action dated Mar. 25, 2014 issued in U.S. Appl. No. 12/863,509.

Office Action dated Apr. 7, 2014 issued in U.S. Appl. No. 12/812,849.

\* cited by examiner

NON-LINEAR OPTICAL DEVICE

The invention relates to non-linear optical devices having a frequency-conversion function.

Non-linear optical effects involving frequency conversion (e.g. optical parametric amplification, frequency up/down-conversion etc) generally require phase-matching of at least two optical fields for efficient operation. For example in the case of second harmonic generation, the refractive index $n_\omega$ of a non-linear medium for a fundamental field of frequency $\omega$ is required to be substantially the same as the refractive index $n_{2\omega}$ for the second harmonic field at a frequency $2\omega$ so that that the phase velocities of the fundamental and second harmonic fields are substantially the same. In bulk optical systems, phase-matching is typically achieved by exploiting the birefringence of a non-linear optical crystal.

Confinement of the optical fields within a non-linear optical waveguide provides a longer interaction length and hence higher conversion efficiency than is the case when using a non-linear medium in bulk form. However in certain cases, for example where the non-linear optical waveguide is a semiconductor waveguide, birefringent phase-matching is not possible. Some of these cases are important; for example semiconductor waveguides are of interest in the area of integrated photonics and have the advantage that they may be fabricated using well-established semiconductor processing techniques.

The present invention provides a non-linear optical device for converting optical radiation of a first frequency into optical radiation of a second frequency, said device comprising a first optical waveguide having a waveguide core comprising optically non-linear material, and means for exciting a first transverse mode of said optical waveguide at the first frequency, wherein the optical waveguide is arranged to support a second transverse mode at the second frequency such that the phase velocities of the first and second transverse modes at the first and second frequencies respectively are substantially equal.

The invention thus provides a non-linear optical device in which phase-matching of optical radiation at first $\omega_1$ and second $\omega_2$ frequencies is achieved by arranging for these frequencies to propagate in certain transverse modes within a non-linear optical waveguide, the order of the transverse modes being such that their phase velocities are substantially the same as a result of balancing the effects of chromatic and modal dispersion. For example, if $\omega_1 > \omega_2$ (as would be the case for parametric down-conversion for example) then a $TE_{00}$ rectangular waveguide mode of frequency if $\omega_1$ would have a lower phase velocity than that of a $TE_{00}$ mode of frequency $\omega_2$. However if the optical waveguide supports a transverse mode of an appropriate order at the frequency $\omega_2$ then modal dispersion can counteract chromatic dispersion to achieve phase-matching and hence efficient frequency-conversion.

The means for exciting the first transverse mode of the first optical waveguide may comprise a second optical waveguide coupled to the first optical waveguide and means for exciting the fundamental mode of the second optical waveguide at the first frequency, wherein the longitudinal axes of the first and second optical waveguides lie in the same plane and intersect at an angle which provides for fundamental mode radiation at the first frequency in the second optical waveguide to excite said first transverse mode of the first optical waveguide. The angle at which the longitudinal axes of the first and second waveguides intersect dictates the order of the first transverse mode which is excited in the first waveguide and may be chosen appropriately for a particular device providing conversion from one frequency to another.

The efficiency with which optical radiation of the first frequency may be coupled from the second waveguide into the first waveguide is around 50%. However, if the means for exciting the first transverse mode of the first optical waveguide further comprises a third optical waveguide coupled to the first optical waveguide and means for exciting the fundamental mode of the third optical waveguide at the first frequency, the longitudinal axes of the first and third optical waveguides lying in the same plane and intersecting at an angle which provides for fundamental mode radiation at the first frequency in the third optical waveguide to excite said first transverse mode of the first optical waveguide, the total efficiency with which light of the first frequency is coupled from the second and third waveguides into the first waveguide is significantly greater than 50%.

A convenient arrangement for exciting the fundamental modes of the second and third waveguides comprises a multimode interference (MMI) splitter. A single input at the first frequency (e.g. from a semiconductor laser) may be divided into first and second portions by the MMI splitter (e.g. a 1-to-2 way MMI splitter); the first and second portions output from the MMI splitter may then be used to excite the fundamental modes of the second and third waveguides.

MMI devices for lossless splitting of an optical input are described in detail elsewhere, for example European Patent 0 563 084.

A device of the invention could be a parametric frequency up- or down-converter, the first frequency being the pump frequency. Alternatively the device could be an optical parametric amplifier or it could provide second harmonic generation, the first frequency being the pump frequency.

The first optical waveguide may be a semiconductor optical waveguide, for example a waveguide of the GaAs/AlGaAs material system.

Embodiments of the invention are described below with reference to the accompanying drawings in which.

Figure 1:
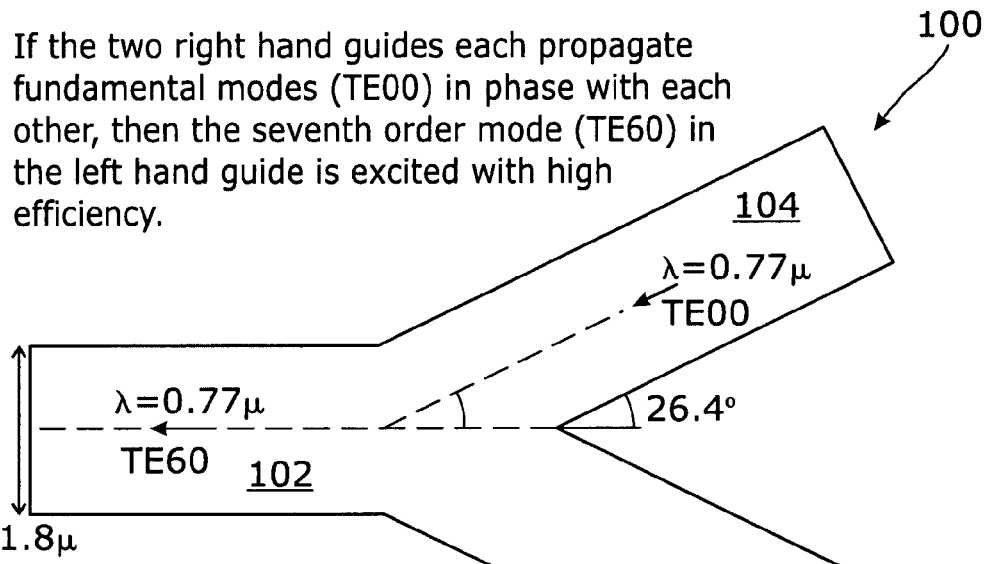
FIG. 1 illustrates a parametric down-conversion device of the invention.

FIG. 1 shows a parametric down-conversion device 100 of the invention having a frequency-conversion waveguide 102 of width 1.8 µm for frequency-conversion and input waveguides 104, 106 each having a width of 1.6 µm. The waveguides 102, 104, 106 are semiconductor ridge waveguides of the GaAs/AlGaAs material system. The longitudinal axes of the input waveguides 104, 106 each intersect that of waveguide 102 at 26.4°. In use of the device 100, input light of wavelength 0.77 µm is input to each of the input waveguides 104, 106 to excite the fundamental modes of these waveguides. On coupling into the non-linear waveguide 102, light from the input waveguides 104, 106 excites the $TE_{60}$ transverse mode of waveguide 102. By parametric down-conversion, output light having a wavelength 1.54 µm is generated within the waveguide 102. Phase-matching is achieved within the waveguide 102 because the $TE_{60}$ transverse mode at the input wavelength (0.77 mm) has substantially the same phase velocity as the fundamental $TE_{00}$ transverse mode at the output wavelength (1.54 μm). Non-linear frequency conversion can therefore take place within the waveguide 102.

Figure 2A:
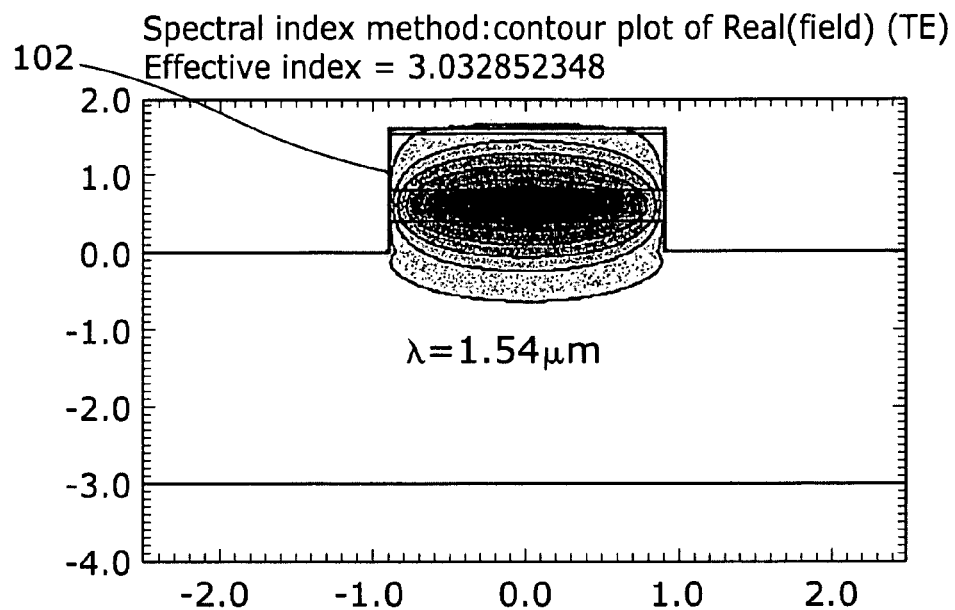
FIGS. 2A & 2B illustrates transverse intensity distributions of transverse optical modes at input and output frequencies within the FIG. 1 device.
Figure 2B:
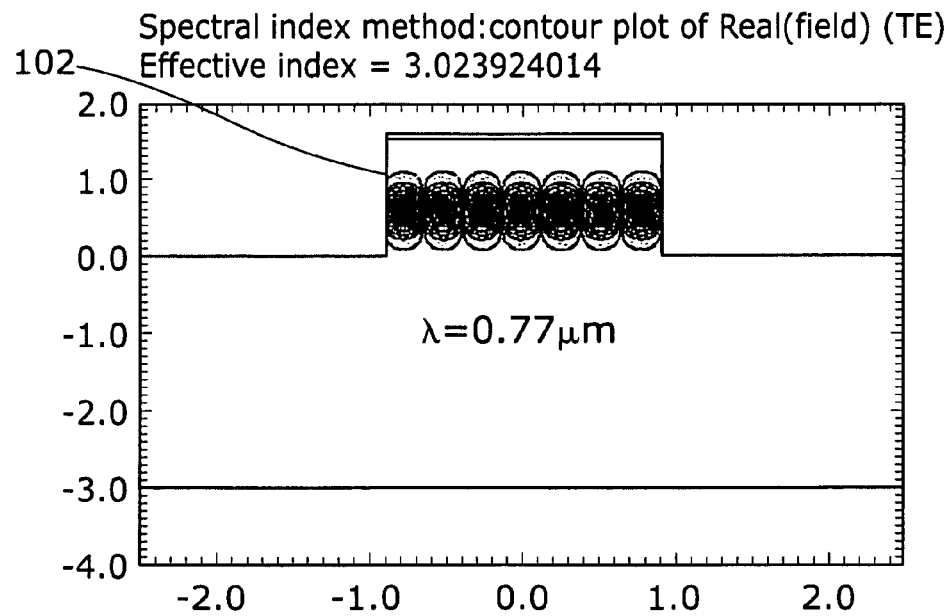

FIG. 2A shows the transverse intensity distribution of the output field (1.54 μm), which is in the $TE_{00}$ (fundamental) transverse mode of the waveguide 102. FIG. 2B shows the transverse intensity distribution of the input field (0.77 μm), which is in the $TE_{60}$ transverse mode of the waveguide 102.

In other embodiments of the invention, the angle at which the longitudinal axes of the input waveguides intersect that of the frequency-converting waveguide may be arranged to achieve excitation of any desired transverse mode of the frequency-converting waveguide. The particular transverse mode excited is chosen such that the phase velocity of the mode at the input frequency is substantially equal to that of some other supported mode of the waveguide at a desired output frequency, thus achieving phase-matching by balancing the effects of chromatic and modal dispersion within the frequency-conversion waveguide.

Figure 3:
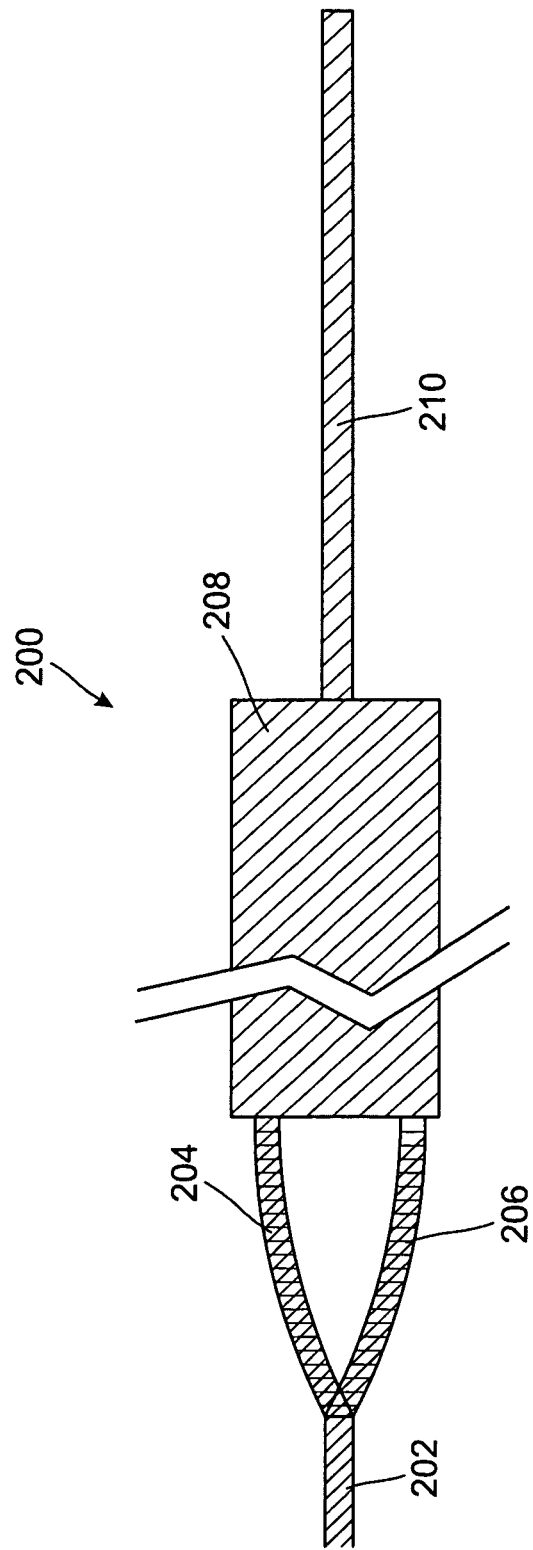
FIG. 3 illustrates a device of the invention incorporating an multimode interference (MMI) splitter as part of an arrangement for generating a desired transverse mode at an input frequency.

FIG. 3 shows another example device 200 of the invention comprising a frequency-conversion waveguide 202 and input waveguides 204, 206 coupled to the waveguide 202 as shown in FIG. 1. The device 200 comprises a 1×2 multimode interference (MMI) splitter 208 arranged for substantially lossless splitting of light input to the MMI splitter 208 via an input guide 210. Output from the MMI splitter 208 is passed to the input waveguides 204, 206 and thence to the frequency-conversion waveguide 202.

The device 100 of FIG. 1 may be used a source of entangled photon pairs if the output photons (1.54 μm wavelength) have parallel or orthogonal polarisation states. Entangled photon pairs are useful in the area of quantum information, for example in the field of quantum cryptography.

The invention claimed is:

1. A non-linear optical device for converting optical radiation of a first frequency into optical radiation of a second frequency, the non-linear optical device comprising:
   a first optical waveguide having a waveguide core comprising optically non-linear material,
   the first optical waveguide supporting, at the first frequency, a first transverse mode that is excited by a first excitation source, and
   the first optical waveguide supporting, at the second frequency, a second transverse mode so as to provide phase velocities of the first and second transverse modes at the first and second frequencies respectively, that are substantially equal; and
   a second optical waveguide coupled to the first optical waveguide, the second optical waveguide supporting, at the first frequency, a fundamental mode that is excited by a second excitation source, wherein
   the longitudinal axes of the first and second optical waveguides lie in the same plane and intersect at an angle that provides for fundamental mode radiation at the first frequency in the second optical waveguide to excite the first transverse mode supported by the first optical waveguide.

2. The non-linear optical device according to claim 1, further comprising:
   a third optical waveguide coupled to the first optical waveguide, the third optical waveguide supporting, at the first frequency, a fundamental mode that is excited by a third excitation source, wherein
   the longitudinal axes of the first and third optical waveguides lie in the same plane and intersect at an angle that provides for fundamental mode radiation at the first frequency in the third optical waveguide to excite the first transverse mode supported by the first optical waveguide.

3. The non-linear optical device according to claim 2, further comprising a multimode interference device arranged to divide input radiation at the first frequency into first and second output portions, wherein
   the first and second portions are applied to the second and third optical waveguides, respectively, to excite the fundamental modes thereof.

4. The non-linear optical device according to claim 1, wherein the device is arranged to provide parametric down-conversion of optical radiation of the first frequency.

5. The non-linear optical device according to claim 1, wherein the device is arranged to provide optical parametric amplification.

6. A source of entangled photon pairs comprising the non-linear optical device according to claim 5.

7. The non-linear optical device according to claim 1, wherein the device is arranged to provide parametric up-conversion of optical radiation of the first frequency.

8. A source of entangled photon pairs comprising the non-linear optical device according to claim 7.

9. The non-linear optical device according to claim 1, wherein the device is arranged to provide second harmonic generation.

10. The non-linear optical device according to claim 1, wherein the first optical waveguide is a semiconductor optical waveguide.

11. The non-linear optical device according to claim 10, wherein the first optical waveguide has a GaAs or AlGaAs core and AlGaAs cladding layers.

\* \* \* \* \*